United States Patent [19]

Hartke et al.

[11] Patent Number: 4,505,227
[45] Date of Patent: Mar. 19, 1985

[54] FEEDER FOR SMALL PIGS

[75] Inventors: Charles A. Hartke; Francis A. Brummer, both of Teutopolis, Ill.

[73] Assignee: Farmweld, Inc., Teutopolis, Ill.

[21] Appl. No.: 583,148

[22] Filed: Feb. 24, 1984

[51] Int. Cl.³ .............................................. A01K 5/00
[52] U.S. Cl. ..................... 119/52 R; 119/63; 119/18; 119/20
[58] Field of Search .................. 119/18, 20, 52 R, 63

[56] References Cited

U.S. PATENT DOCUMENTS

| | | | |
|---|---|---|---|
| 149,349 | 7/1874 | Slaughter | 119/61 |
| 316,435 | 4/1885 | Baker | 119/61 |
| 336,873 | 2/1886 | Street | 119/61 |
| 339,694 | 4/1886 | Rine | 119/61 |
| 401,249 | 4/1889 | Burton | 119/61 |
| 430,950 | 6/1890 | Hicks | 119/61 |
| 1,063,661 | 6/1913 | Critz, Jr. | 119/61 |
| 1,102,371 | 7/1914 | Warren | 119/61 |
| 1,133,755 | 3/1915 | Simpson | 119/61 |
| 1,154,768 | 9/1915 | Herold | 119/63 |
| 1,531,617 | 5/1924 | Jahde | 119/61 |
| 1,572,483 | 2/1926 | Hoier | 119/52 |
| 1,715,493 | 7/1923 | Clay | 119/61 |
| 1,832,999 | 11/1931 | Rummell | 119/52 R |
| 2,135,867 | 3/1938 | Clark | 119/52 |
| 3,418,974 | 12/1968 | Reeves | 119/18 |
| 4,401,056 | 8/1983 | Cody et al. | 119/18 |

FOREIGN PATENT DOCUMENTS 102577 2/1926 Austria .................. 119/63

Primary Examiner—Robert P. Swiatek
Attorney, Agent, or Firm—Kinney & Lange

[57] ABSTRACT

A feeder is mounted on a gate portion of a nursery pen used for small pigs in a provided opening on horizontal pivot points to permit the feeder to be moved from a first feeding position wherein the pigs on the interior of the pen can feed, and upon release of a retainer flipped about its pivot axis into a substantially inverted position for cleaning. The pivoting is done on an axis that keeps the opening in the gate blocked during the time the unit is in its feeding position while it is being flipped to its inverted position, and also when it is being held in its cleaning position. The feeder has a feed supply hopper with a filling opening that is accessible from the exterior of the pen for easy loading.

7 Claims, 4 Drawing Figures

FEEDER FOR SMALL PIGS

BACKGROUND OF THE INVENTION

1. Field of the Invention
2. Description of the Prior Art

In the prior art, various pivoting type mangers, watering troughs and and the like have been advanced. For example, U.S. Pat. No. 149,349 shows a cattle trough that is capable of being rotated for dumping. The trough is mounted between two posts and pivots about a horizontal axis which is substantially centrally located on the trough configuration. Latches are provided on the support posts holding the trough in either an upright or an inverted position.

U.S. Pat. No. 316,435 shows a manger that is pivotably mounted about a central horizontal axis that is located at the top edge of the manger, and which can be rotated between two positions, against stops. It is supported between upright posts on its pivot members.

A feed trough which is mounted for dumping movement about an axis along one edge is shown in U.S. Pat. No. 339,694. U.S. Pat. No. 336,873 shows a pivoting trough used for railway stockcars. The trough can be dumped for cleaning. U.S. Pat. No. 401,249 also shows a feed trough having a horizontal pivot axis for mounting with the axis positioned adjacent the upper edge of the trough.

U.S. Pat. No. 430,950 shows a pivoting trough for stockcars as well, and it has an axis of pivot to one side and adjacent the lower portions of the trough so that it can be dumped forwardly.

U.S. Pat. No. 1,063,661 shows a stock trough that is mounted on the inside of a pen and is made so that it can be dumped through the slats of the pen about a horizontal axis adjacent the top and at one edge thereof.

U.S. Pat. No. 1,102,371 shows a feed box or trough that also pivots about an axis adjacent one side and near the top, and which is used in a horse stall.

A watering trough which has a horizontal axis to permit pivoting upside down for dumping is shown in U.S. Pat. No. 1,133,755 and a hog trough also having a pivoting axis adjacent its lower edge is shown in U.S. Pat. No. 1,531,617.

A feed trough assembly that has mounts for a series of troughs, each of which is pivotably mounted for dumping about an axis adjacent one edge thereof is shown in U.S. Pat. No. 1,572,483.

The concept of having a feed trough mounted on a pivoting gate is disclosed in U.S. Pat. No. 1,715,493. This patent, however, has a small opening in the lower edge of the gate, and includes a trough that is mounted about a pivot axis that is located above the trough. The trough has to be pulled with a handle for dumping, and it does not have any substantial hopper capacity.

A feeder is shown in U.S. Pat. No. 2,135,867 which has a trough section that can be pivoted forwardly for dumping.

The above examples are typical of the prior art devices, which show pivoting watering troughs and feed troughs. None disclose the use in a pen wall wherein a substantial opening is used, and the trough will block the opening as it is pivoted between a working or feeding position and a cleaning or dumped position, and wherein the feed trough and feeder have a filling opening that is readily accessible from the exterior of the pen. The present feeder permits a substantial amount of pivoting, for example, on the order of 170° of pivoting, for dumping movement to clean.

SUMMARY OF THE INVENTION

The present invention relates to a feeder that will mount into a gate or wall of a nursery pen for little pigs in particular, through a provided opening about a horizontal axis that is positioned so that the feeder hopper is accessible from the exterior of the pen, and the feed trough portion is positioned so that pigs on the interior of the pen can easily eat. The feeder is positively locked in its feeding position with a one hand operated strap that latches conveniently onto exterior portions of the trough to hold it securely in place. The lower portion of the feeder will bear against the lower edges of the opening in which it is positioned to positively hold the feeder in feeding position. The feeder can be flipped over with one hand so that if a farmer is carrying feed or something and wants to dump the feeder trough, it can be done easily.

Once the latch is released, the trough will, if it is close to empty in any event, rotate easily about its pivot axis, and as it rotates the opening in the pen will be blocked so that the little pigs on the inside of the pen cannot get out. The full inverted position of the trough dumps all the feed and any trash and permits flushing the trough portion. The feeder pivots substantially 170°. The feeder will remain inverted under the forces of gravity and then when it has been cleaned (and flushed with water), it can be pivoted back to its working or feeding position, latched in place, and be ready for use again.

The feeder includes a hopper that provides a controlled amount of feed to the trough that is accessible to the little pigs so that a substantial supply of feed can be left in the hopper and then the pigs will self-feed. However, the pivoting feeder with a hopper that is readily accessible from the exterior of the pen makes the operation and use very simple. Little feed is lost, and yet contamination or debris can be moved easily when feeding is again to be done.

The feeder trough is securely made, and will stop in its working position and be latched in position so that the little pigs cannot poke it out of the way or push it out of the way as they are easting.

DETAILED DESCRIPTION OF THE PREFERRED EMBODIMENTS

Figure 1:
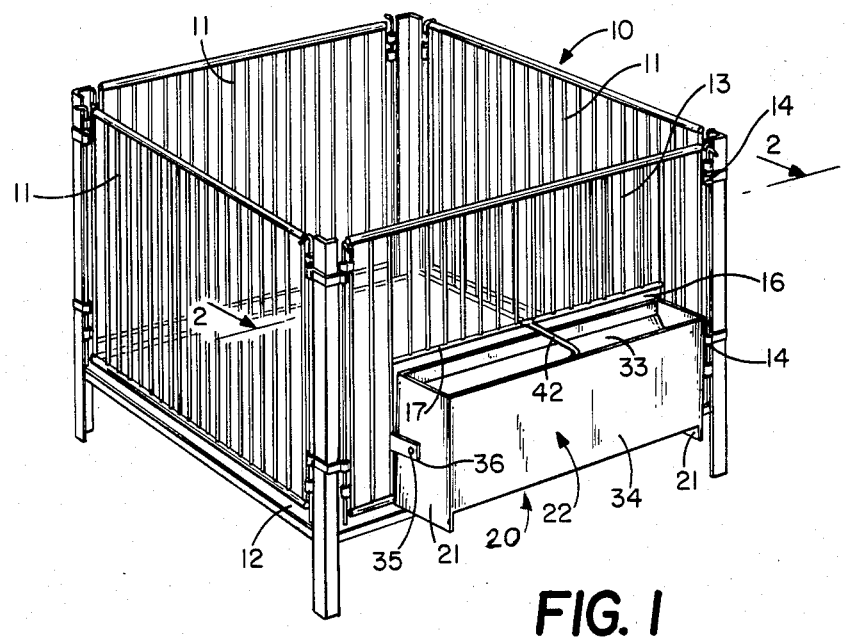
FIG. 1 is a perspective view of a pen having a feeder made according to the present invention installed thereon.
Figure 2:
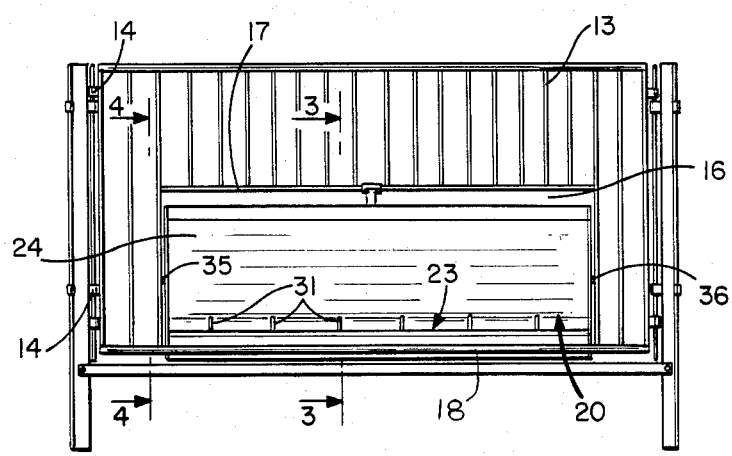
FIG. 2 is an elevational view of the feeder of FIG. 1 and one panel of the pen taken from the interior of the pen.

A nursery pen for little pigs indicated generally at 10 is of conventional design and includes a plurality of slatted upright walls 11 defining the pen, and a mesh bottom floor 12 for the pigs. The pen is usually supported off the floor a distance for sanitary reasons, and each of the pens, in a normal configuration, has a slatted gate or wall 13 that is hinged to the pen walls about suitable hinges indicated at 14 at one side of the pen.

This gate 13 will swing out so that the full side of the pen is out of the way for putting pigs into the pen or taking them out.

The slatted gate 13 as shown is provided with an opening 16 which is of size to provide access to a pivoting feeder assembly 20 made according to the present invention. The opening 16 is defined by a top cross member 17 and a lower cross member 18. The sides of the opening are defined by upright slats or posts of the gate 13. The pivoting feeder assembly, as shown, substantially fills or obstructs the opening 16, and has a pair of end panels 21,21 which are of suitable size, as will be explained, to provide stops for the pivoting movement of the feeder assembly 20.

Figure 3:
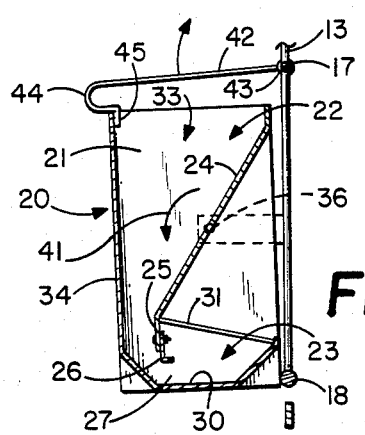
FIG. 3 is a sectional view taken on line 3—3 in FIG. 2.

The feeder assembly includes a hopper portion 22 and a trough portion 23. The hopper portion 22 is formed with a divider wall 24 which extends between the end walls or panels 21. The divider wall is inclined from adjacent the gate 13 outwardly and downwardly, as shown in FIG. 3. The hopper terminates at its lower end with a vertical wall portion 25 on which an adjustable slide 26 is mounted for vertical movement to adjust the amount of a lower opening 27 from the hopper to the trough.

The trough portion 23 is formed with a bottom wall 30 that has inclined sections at the inner and outer edges, as shown, to form the trough. Divider rods 31 are mounted over the opening to the trough to reinforce the back wall. The rods provide individual feed openings between the rods.

The feeder assembly is welded, so that the end panels 21 are securely held, and as shown a hopper opening 33 is provided at the top of the hopper and on the exterior of the pen. The feeder assembly includes a forward wall 34 that extends between the end panels 21 and forms the front wall of the hopper.

The forwardly and downwardly sloping wall 24 provides the trough portion 23 with an opening area above the rods 31 so small pigs on the interior of the pen 10 can eat from the trough. The pigs can feed easily while standing on the interior of the pen.

Each of the side panels or plates 21 has a pivot pin indicated at 35 fixed thereon. The pins 35 form a pivot axis which is substantially centered on the side panels 21. The pins 35 in turn are pivotably mounted on straps 36 which are welded to the upright side slats or members defining the opening 16, to support the feeder assembly in position to the exterior of the pen 10 and for pivotal movement on a generally centered horizontal axis.

The lower edges of the side panels or plates 21 are of size to bear against the lower horizontal cross member 18 defining the lower edge of the opening 16, so that the feeder assembly 20 will not pivot beyond a stopped position in direction as indicated by the arrow 41 in FIG. 3. In order to hold the feeder assembly 20 in its usable position, with the trough portion 23 accessible to the little pigs, a single latch strap 42 is mounted on the wall or gate 13. The latch strap has a hub 43 that mounts over the upper horizontal cross member 17 defining the opening 16, and the latch strap 42 freely pivots about the horizontal cross member 17. The outer end of the latch strap 42 is bent with a bow or spring portion 44 which has a lock detent tab 45 extending at about 90° to the main portion of the strap to engage the inner surface of the forward wall 34. Forward wall 34 may have an upper edge lip for reinforcing it if desired. The spring bow 44 and detent tab 45, which fits into the hopper opening 33, securely hold the feeder assembly 20 in its stopped position with the lower end portions of the side panels 21 against the lower cross member 18. As the little pigs push on the rods 31 or on the trough portions below the pivot axis of the feeder assembly 20, the trough will be securely held against rotation to its dumping position.

On the other hand, tab 45 may be released easily as latch strap 42 is pivoted upwardly about its hub 43 to a position where the tab clears the upper edge of the wall 34 to permit the feeder assembly 20 to be pivoted in direction opposite from that indicated by the arrow 41 for dumping.

Figure 4:
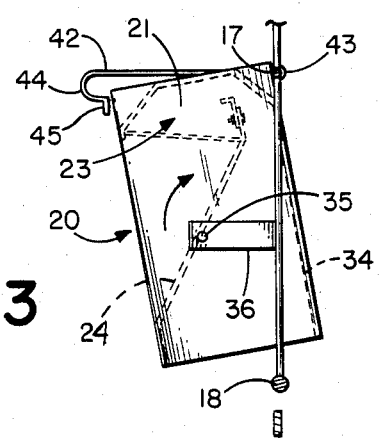
FIG. 4 is a sectional view taken on line 4—4 in FIG. 2 with the feeder assembly in inverted or dumping position.

It should be noted that as the feeder assembly is pivoted, once the latch strap 42 has been released, the upper portions move into the pen, and the lower portions move away from the pen wall. The side panels are of size so that the upper ends will clear the upper horizontal cross member 17, and pivoting is permitted. During the time that the trough pivots to its dumping position as shown in FIG. 4, the feeder assembly will keep the opening 16 substantially blocked so that the pigs on the interior of the pen cannot get out. The trough will pivot a full 170° until the side panels 21 contact upper horizontal cross member 17 to insure that the trough will be stopped in the dumping or cleaning position. The center of gravity of the feeder assembly is such that it will remain in this inverted position for cleaning.

The feeder assembly is easily flipped about its pivot axis, comprising the axis of the pins 35, on the straps 36 back to its working position and the latch strap 42 then can easily be put into place with the tab 45 on the inside of the upper edge of the forward wall to hold the feeder assembly at its working position.

The feed hopper opening is easily accessible for filling, and the hopper will retain a substantial amount of feed for self-feeding the pigs. The adjustable slide 26 can be adjusted by loosening the bolts that hold it in place and moving it up and down to adjust the opening for feed movement into the trough portion as desired.

Thus in combination with a nursery pen, the feeder provides the advantages of a self-feeder, with a storage hopper, easy one-handed operation for inverting it for cleaning when desired, and including a latch that will positively hold it in its working position against the pushing and shoving of small pigs on the inside of the pen.

The positioning of the pivot axis of pins 35 in a center location, particularly in vertical direction, results in a reduced vertical height necessary for pivoting to dump. For example, the feeder of the present invention rotates between usable position and dumping position in substantially the same space it occupies during use.

The pens can be close to the floor and the feeder will still dump. A feeder pivoted near the bottom has to be supported off the floor a substantial distance in order to permit it to rotate downwardly 170° for dumping. Dumping movement in a space not substantially larger than the opening in the pen makes the present arrangement usable in a number of different pen configurations (on the floor, stacked, etc.) while conserving space.

The unit is easily made, easily used, and gives the advantages of simple operation as described.

Although the present invention has been described with reference to preferred embodiments, workers skilled in the art will recognize that changes may be made in form and detail without departing from the spirit and scope of the invention.

What is claimed is:

1. In combination with a pen wall forming one wall of a pen for young livestock having an opening of substantial size therein in relation to the size of the pen wall and defined by upper and lower edges, the improvement comprising a pivoting feeder assembly including means for forming pivot support members along the lateral sides of said opening, the feeder assembly being pivotably mounted on said supports, the feeder assembly being of size to substantially block the opening in such pen wall when in a first working position, said feeder assembly including:

a hopper portion having a filling opening at the top thereof positioned on the outside of the pen when the feeder assembly is in a working position, the hopper portion being defined in part by a forward wall and a hopper wall which inclines in direction downwardly and outwardly from the pen from adjacent a top edge of the feeder with the feeder assembly in its working position and defining a generally horizontal laterally extending opening at a lower portion thereof;

the feeder assembly including a trough portion on the opposite side of said hopper wall from said hopper portion and defining an opening accessible from the interior of a pen formed with the pen wall, the trough portion holding feed from the hopper portion and being accessible to livestock on the interior of such pen; and a latch on the exterior of the pen wall that is releasable upon movement in a single pivoting direction to permit the feeder assembly to pivot so that the upper portions move into the interior of a pen on which such pen wall is mounted about the pivot axis until the trough portion is substantially inverted.

2. The combination as specified in claim 1 wherein said latch comprises a single strap pivotably mounted on an upper horizontal member defining said opening and having a tab portion that fits into the opening leading to said hopper portion and bears against the upper interior edge of the forward wall of the hopper portion.

3. The apparatus as specified in claim 1 wherein the feeder assembly has side panels that are substantially vertical and are at the ends of the feeder assembly, said side panels having lower edge portions which engage the lower horizontal member defining the opening in such pen wall when the trough is in its working position and the latch is secured.

4. The apparatus as specified in claim 3 wherein said latch comprises a strap member having a spring portion and a tongue that fits on the interior of the opening to the hopper portion and provides a bias force urging the side panels of the feeder assembly against lower horizontal member defining the opening in the pen wall when in latched position.

5. The apparatus of claim 1 wherein the feeder assembly pivot axis is substantially midway in vertical direction of the feeder assembly, the feeder assembly substantially blocking the opening in the pen wall when substantially inverted.

6. The apparatus of claim 1 wherein the feeder assembly includes a pair of end panels, the means forming pivot support members comprising a separate pin fixed to and extending outwardly from each of the end panels and being coaxial and substantially centered on the end panels and strap means mounted on the pen wall and pivotally receiving the pins.

7. The apparatus of claim 1 wherein the feeder assembly comprising a pair of laterally spaced apart, generally vertical end panels extending outwardly from the pen wall, a bottom wall fixed to and extending between the end panels, the forward wall extending between the end panels at the forward side thereof and extending from the top to the bottom wall, the hopper wall extending between the end panels and starting adjacent the upper edge of the panels at the side adjacent the pen wall and inclined downwardly and forwardly and terminating spaced from the forward wall and the bottom wall, the bottom wall having an upwardly inclined portion adjacent the pen wall and spaced from the inclined hopper wall to form the trough portion, and a plurality of elongated supports spaced apart in direction between the end panels and fixed to the inclined hopper wall and the upper edge of the upwardly inclined portion of the bottom wall.

* * * * *